United States Patent
Le Clerc et al.

(10) Patent No.: US 7,627,175 B2
(45) Date of Patent: Dec. 1, 2009

(54) IMAGE SEGMENTATION METHOD AND DEVICE

(75) Inventors: François Le Clerc, Rennes (FR); Lionel Oisel, La Nouaye (FR); Bertrand Chupeau, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 660 days.

(21) Appl. No.: 11/314,380

(22) Filed: Dec. 21, 2005

(65) Prior Publication Data

US 2006/0147116 A1  Jul. 6, 2006

(30) Foreign Application Priority Data

Jan. 6, 2005 (FR) .................................. 05 50060

(51) Int. Cl.
    *G06K 9/00* (2006.01)
(52) U.S. Cl. .................. 382/173; 382/199; 382/162
(58) Field of Classification Search ............. 382/162, 382/173, 199
    See application file for complete search history.

(56) References Cited

U.S. PATENT DOCUMENTS

| | | | | |
|---|---|---|---|---|
| 5,881,170 | A | * | 3/1999 | Araki et al. ............... 382/199 |
| 5,901,240 | A | | 5/1999 | Luo et al. |
| 6,937,760 | B2 | * | 8/2005 | Schoepflin et al. .......... 382/173 |
| 2004/0109592 | A1 | | 6/2004 | Bankman et al. |

OTHER PUBLICATIONS

Chuang Gu and Ming-Chieh Lee, Tracking of Multiple Semantic Video Objects for Internet Applications, XP-000870022, pp. 806-820, 1998.

EP Search Report, Jul. 21, 2005.
"Interactive Color Image Segmentation Editor Driven by Active Contour Model", Jean Gao et. al., Purdue University, West Lafayette, Indiana, 1999 IEEE, pp. 245-249.
"A Robust Snake Implementation a Dual Active Contour", Steve R. Gunn et. al., 1997 IEEE pp. 63-68, XP000682684.
"Color Invariant Snakes", Theo Gevers et. al, University of Amsterdam, Kruislaan 403 1098 SJ Amsterdam, The Netherlands, pp. 578-588, 1998 (estimated).
"Color and Texture Priors in Active Contours for Model-based Image Segmentation", Qiang Zhou et. al., School of Engineering and Computer Science, Ohio University, Athens, OH, (Year 2003).
A New Colour Image Energy for Active Contours in Natural Scenes, K. P. Ngoi et. al., 16th Oct. 1995, Revised 14th May 1996, Pattern Recognition Ltr. 17 (1996) 1271-1277.
"An Optimally Fast Greedy Algorithm for Active Contours", Ali R. Mirhosseini et. al., Jun. 9-12, 1997 IEEE, International Symposium on Circuits and Systems.

* cited by examiner

*Primary Examiner*—Phuoc Tran
(74) *Attorney, Agent, or Firm*—Robert D. Shedd; Robert B. Levy

(57) ABSTRACT

The invention relates to a device and a method for segmenting objects in an image. The method comprises steps for:
 the approximate definition of a contour external to the object to be segmented, said contour including a plurality of so-called control points,
 the determination of a vicinity of candidate points in the vicinity of each control point,
 the determination of an energy associated with each candidate point in the vicinity of each control point,
 the convergence of each of the control points ($V_i$) towards the candidate point, which minimizes said energy, so providing an estimated contour of the object to be segmented.

According to the invention, the energy associated with each candidate point includes a colour discrimination term.

8 Claims, 4 Drawing Sheets

IMAGE SEGMENTATION METHOD AND DEVICE

The invention relates to a device and a method for segmenting images.

BACKGROUND OF THE INVENTION

The segmenting of objects in images by automatic image analysis is normally highly complex, insoluble without the assistance of a human operator. The reason for this is that there is no universal criterion at image level for characterizing the object and separating it from its environment, since a semantic object is liable to be made up of a number of regions of widely differing colours and textures.

The segmenting of semantic objects finds various applications in widely varying fields and, in particular:

- in film post-production, for touching up colours limited to objects, or for isolating an object in a sequence in order to embed it in another sequence,
- in video coding, to enhance the compression ratio by coding the object in a single frame then transmitting only its changes of position,
- in video indexing, in order to extract semantically relevant information regarding the content of the images.

Methods of segmenting semantic objects based on the active contours ("snakes") formalism are known, consisting in having an initial approximation of the contour of the object evolve by latching onto the faces of the image, while satisfying the regularity constraints of the contour curve.

Also known are methods of segmenting objects based on the colour, classifying the pixels of the image or a region of the image in pixels of the object and pixels of the background based on their location in a colour space.

BRIEF DESCRIPTION OF THE INVENTION

The present invention proposes a method based on the active contours and also taking into account a colour discrimination constraint between the object to be segmented and the background.

To this end, the present invention proposes a method of segmenting objects in an image comprising steps for:

- the approximate definition of an external contour of the object to be segmented, said contour including a plurality of so-called control points,
- the determination of a vicinity of candidate points in the vicinity of each control point,
- the determination of an energy associated with each candidate point in the vicinity of each control point,
- the convergence of each of the control points towards the candidate point which minimizes said energy, so providing an estimated contour of the object to be segmented.

According to the invention, the energy associated with each candidate point includes a colour discrimination term. This makes the energy term more robust and the results obtained provide for segmenting of the object very close to the actual contour of the object compared to the existing methods which do not use colour discrimination.

According to a preferred embodiment, the method includes a step for automatically calculating a contour inscribed in the estimated contour, and a contour circumscribed around the estimated contour, such that the inscribed contour is internal to the object to be segmented and the circumscribed contour is external to the object to be segmented.

According to a preferred embodiment, the method includes a step for classifying in two regions pixels located in the space between the inscribed contour and the circumscribed contour, the pixels with colour closer to the distribution of the colours of the object than the distribution of the gutter colours in the vicinity of the object being labelled object and the other pixels being labelled gutter.

According to a preferred embodiment, the method includes a step for labelling the candidate points for each control point of the estimated contour, the label identifying whether each candidate point is internal to the estimated contour or external to the estimated contour.

According to a preferred embodiment, the method includes a step for counting the pixels for each candidate point in the vicinity of each control point, from the number of points $N_1$ and $N_2$ defined as follows:

- $N_1$ is the number of points labelled as internal to the estimated contour and for which the colour is labelled object,
- $N_2$ is the number of points labelled as external to the estimated contour and for which the colour is labelled gutter.

According to a preferred embodiment, the energy associated with each candidate point is made up of a weighting, in addition to the colour discrimination term, a gradient term pulling the approximate contour drawn by the user towards the faces of the image, a tension term minimizing the length of the contour and a second-order regularization term minimizing the curves that are too pronounced.

According to a preferred embodiment, the minimization of the energy term relative to the colour discrimination term consists in selecting, for each control point, the candidate point in the vicinity of the control point for which the sum $N_1+N_2$ is minimal.

The invention also relates to a device for segmenting objects in an image comprising means for:

- the approximate definition of an external contour, the contour including a plurality of so-called control points,
- the determination of a vicinity of candidate points in the vicinity of each control point,
- the determination of an energy associated with each candidate point in the vicinity of each control point,
- the convergence of each of the control points towards the candidate point which minimizes said energy, so providing an estimated contour of the object to be segmented.

According to the invention, the energy associated with each candidate point includes a colour discrimination term.

BRIEF DESCRIPTION OF THE DRAWINGS

The invention will be better understood and illustrated by means of exemplary embodiments and advantageous implementations, by no means limiting, with reference to the appended figures, in which.

DETAILED DESCRIPTION

The modules shown are functional units, which may or may not correspond to physically distinguishable units. For example, these modules, or some of them, may be combined in a single component, or constitute features of one and the same software package. Conversely, some modules may, if necessary, be made up of physically separate entities.

According to the method disclosed by the invention, when a user wants to segment an object that he is viewing on a screen, he draws an approximate outline of the boundaries of the object which must be external to the object. One object of the invention is to define a method for making this initial approximate contour converge towards the real contour of the object to be segmented. This method is based on an algorithmic plan of the active contours.

Figure 1:
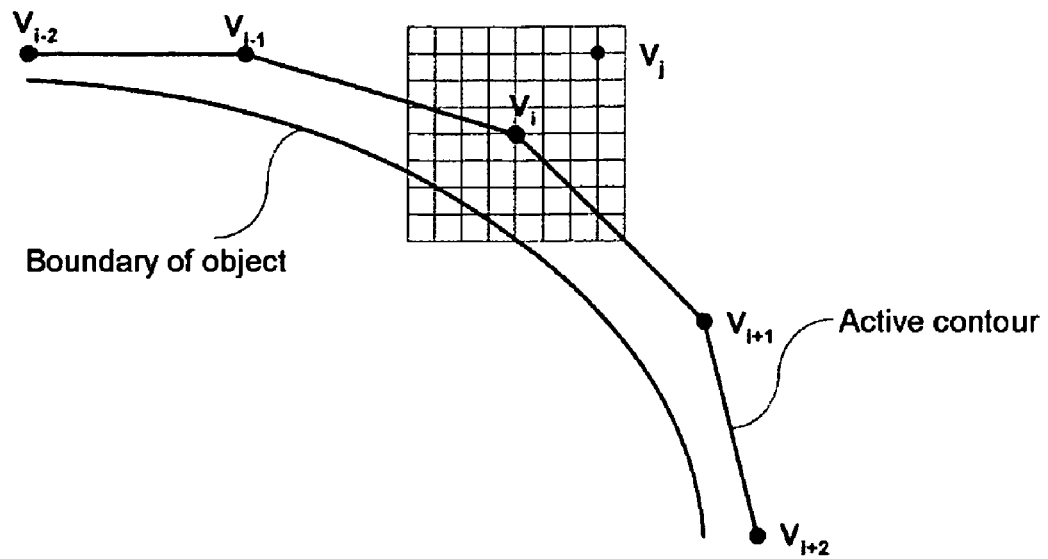
FIG. 1 shows a view of the active contour and of the true contour of the object trying to be estimated.

FIG. 1 shows the actual contour of the object to be segmented and the active contour, in a step of its process of convergence from the initial contour supplied by the user.

The active contour is defined by a certain number of control points $V_i$, corresponding to the ends of the arcs forming the contour. In the case where the contour is modelled by a polygon, these arcs are straight-line segments, and the control points are made up of the ends of these segments. The number of control points $V_i$ varies according to the complexity of the contour.

According to the invention, the control points $V_i$ are made to converge towards the actual contour of the object, according to a convergence plan known by the name of active contours. An active contour is defined as a parametered curve in an image, which iteratively approaches the boundary of an object under the influence of internal forces, calculated from the contour curve itself, and of external forces, which depend on the image. The internal forces constrain the shape of the curve to satisfy regularity constraints, the external forces optimize the positioning of the curve relative to the content of the image. The application of these forces is reflected in the minimizing of an energy functional.

Although it is theoretically possible to seek a simultaneous convergence of all of the control points by performing an overall minimizing of the energy functional, the convergence of the active contour is in practice performed using a greedy algorithm, initially proposed in the article by D. J. Williams and M. Shah, entitled "A Fast Algorithm for Active Contours and Curvature Estimation", published in the CVGIP review: Image Understanding, volume 55 no 1, January 1992, pages 14 to 26.

According to this algorithm, the minimizing of the energy is performed iteratively on each of the control points, until the contour is stabilized. To this end, a search window is defined in the vicinity of each control point. Each point inside this window constitutes a candidate point for the position of the new control point. The control point is moved in the window towards the candidate point for which a certain functional called energy is minimal. This process is applied in turn to all the control points, until convergence of the contour is achieved.

The size of the window can, for example, be set at 21 pixels by 21 pixels. In other embodiments, the size of the window may be different. The size of the window to be used depends on the target application and the resolution of the image being processed.

With reference to FIG. 1, the term $V_i$ is used to denote the current position of a control point of the active contour. The aim is to make $V_i$ converge towards the true contour by calculating, for each point $V_j$ of a search window around $V_i$, the energy of the contour obtained by replacing $V_i$ with $V_j$, and by selecting the control point that provides the minimum energy as the new control point.

According to a known method of segmenting by active contours, the energy E(i) of the control point $V_i$ is defined as being the weighted sum of the following three terms:

1. a continuity term favouring a constant spacing between control points; this term can, for example, be defined according to the distance from $V_j$ to the adjacent control points $V_{i-1}$ and $V_{i+1}$ and the average distance $\bar{d}$ between control points:

$$E_{continuity}(i, V_j) = \frac{\left| \|V_j - V_{i-1}\|^2 + \|V_j - V_{i+1}\|^2 - 2\bar{d}^2 \right|}{\underset{k}{\text{Max}} E_{continuity}(k)}$$

2. a second-order regularization term, the object of which is to avoid curves of the contour that are too pronounced, that can be defined, approximating the curve by finite differences, as:

$$E_{curve}(i, V_j) = \frac{\|V_{i-1} - 2V_j + V_{i+1}\|^2}{\underset{k}{\text{Max}} E_{curve}(k)}$$

3. a gradient term which pulls the contour towards the faces of the image, giving precedence to the faces for which the direction is parallel to the estimated contour: this term can be calculated according to the gradient vector $G(V_j)$ in the vicinity of $V_j$ and the normal $n_{ext}(i)$ external to the contour at $V_i$, by:

$$E_{gradient}(i, V_j) = -\frac{n_{ext}(i) \cdot G(V_j)}{\underset{k}{\text{Max}} G(V_k)}$$

The weighting of these terms is defined by the user according to the properties of the contour. It can, for example, reduce the weight of the regularity terms in the case of highly convoluted shapes.

The method of segmenting by active contours, as described above, relies mainly on the detection of the boundaries of the object. The object of the invention is to introduce in the method of segmenting by active contours an additional constraint ensuring a certain uniformity in colour terms of the delimited region of the contour, in order to enhance the quality and the robustness of the segmentation obtained.

The invention relates more particularly to the means of determining an additional term of the energy functional conditioning the convergence of the active contour. This colour discrimination term $E_{colour}(i, V_j)$ relies on the classification of the pixels in the vicinity of the estimated contour as "object" pixels and "non-object" pixels according to their colour, a classification which is made based on an initial knowledge of the distribution of the colours of the object and its vicinity. $E_{colour}(i, V_j)$ modifies the positioning of the contour to favour, in the vicinity of the contour, the placement of "object" classified pixels inside the contour, and the classification of "gutter" classified pixels outside the contour.

Figure 2:
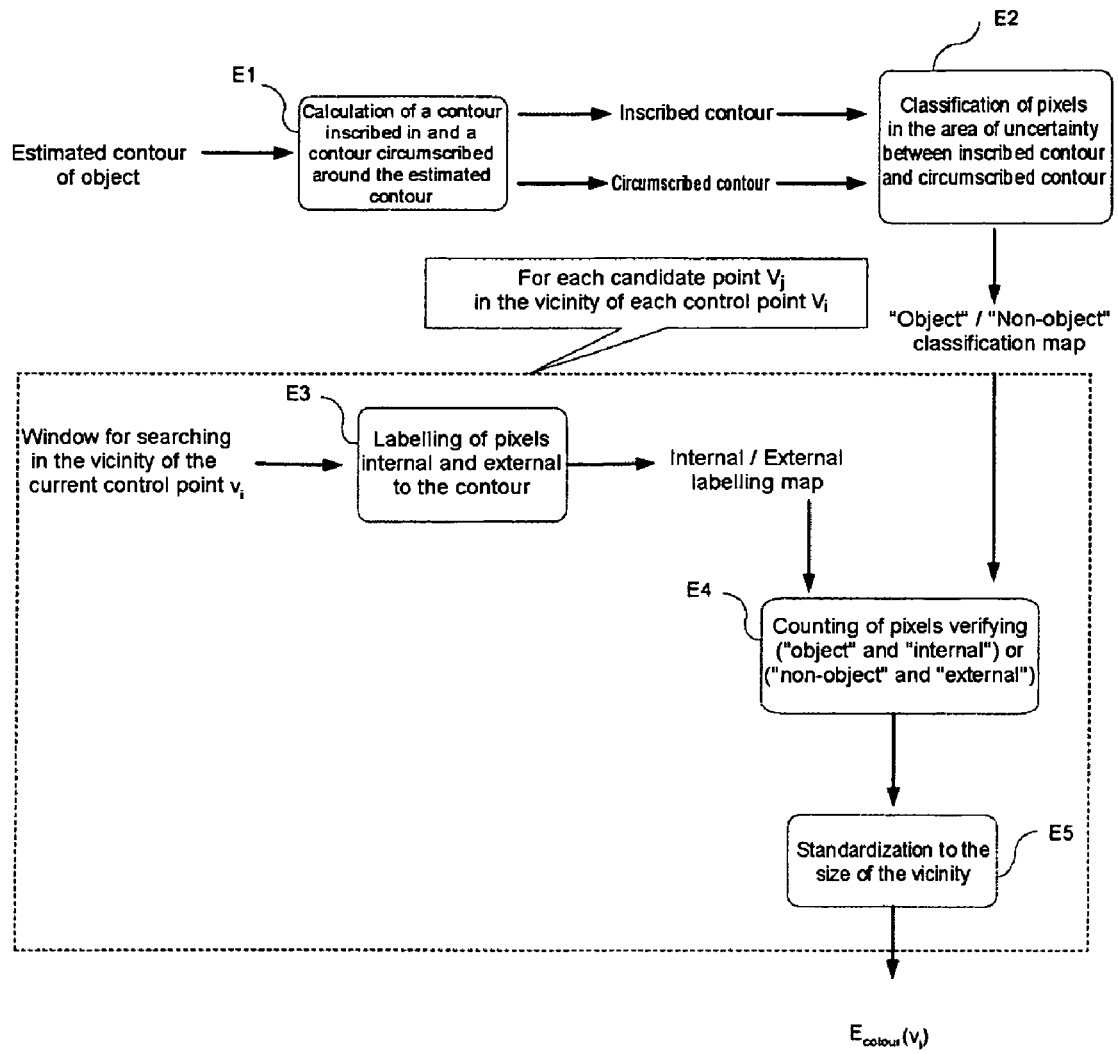
FIG. 2 shows the various steps representing the calculation of the colour discrimination term.

FIG. 2 gives a block diagram describing the means of calculating the colour discrimination term.

Figure 3:
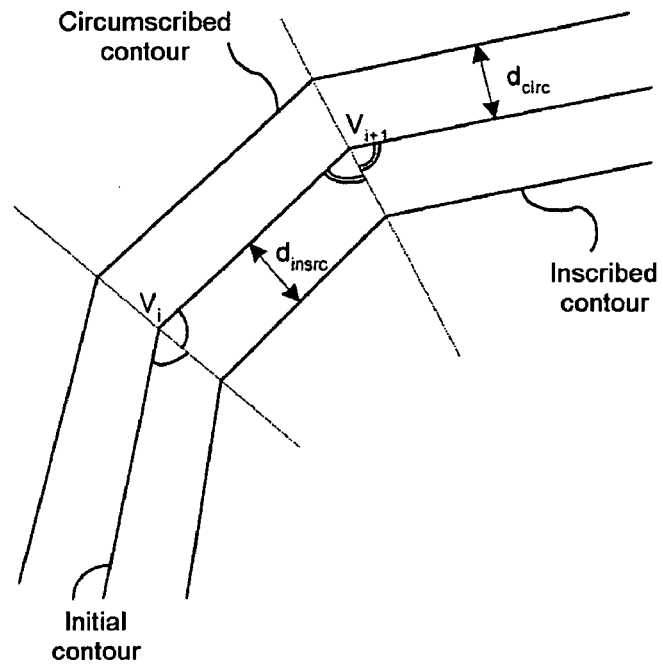
FIG. 3 illustrates the method of calculating a polygon inscribed in and a polygon circumscribed around an initial polygon.

Firstly, in a step E1, an inscribed contour, internal to the object, and a circumscribed contour, external to the object, are defined on the basis of the initial contour. As an example, FIG. 3 shows a geometrical method of constructing an inscribed contour and a circumscribed contour, when the contour is modelled by a polygon. For each peak $V_i$ of the initial contour, the bisector of the angle formed by the two adjacent segments is constructed at the peak and passing through the peak. A peak of the circumscribed (or inscribed) polygon is linked to $V_i$ by moving $V_i$ by a predefined distance $d_{circ}$ (or $d_{inscr}$) towards the outside (or towards the inside) along the bissector.

Good operation of the invention requires the inscribed contour to be entirely internal to the object and the circumscribed contour to be all external to the object. If necessary, it may require the human operator to adjust the contours calculated automatically by the method described above, in order for these two conditions to be satisfied.

In a step E2, each of the pixels located in the area of uncertainty bounded by the inscribed and circumscribed contours is classified as an "object" pixel or "non-object" pixel according to its colour which provides a binary classification map in this area. Various classification methods can be applied to this end. Two methods are described below by way of illustration:
 a method based on the construction of models of the colour distribution of the object and that of the gutter, where the pixels are classified according to the proximity of their colour to these distributions,
 a method based on an algorithm known as "Seeded Region Growing", in which regions are grown from reference points distributed around the circumscribed contour and the inscribed contour.

The steps E1 and E2 are performed prior to starting the active contour convergence process. The other steps of the method, E3 to E5, described below, are repeated on each iteration of the active contour convergence process in the vicinity of a control point.

In a step E3, a second binary segmentation map is constructed in the search window for a new contour point in the vicinity of the current control point $V_i$. This map, recalculated for each candidate position $V_j$ of the new contour point, assigns each pixel of the window a label specifying whether the pixel is located inside or outside the contour obtained by considering $V_j$ as the new contour point. When the contour is modelled by a polygon, the calculation of these maps can be based on algorithms well known in computer graphics, making it possible to test whether a point is or is not located inside a polygon.

A step E4 uses the segmentation map based on the classification as "object" pixels and "non-object" pixels resulting from the step E2 on the one hand, and the map of segmentation into pixels inside and outside the candidate contour, obtained from the step E3, on the other hand. Based on these two maps, a count is made, inside the search window in the vicinity of $V_i$, of the pixels satisfying the following conditions:
 pixel detected in the step E2 as belonging to the object and labelled in the step E3 as being located inside the contour passing through $V_j$, or $N_1$ pixels,
 pixel detected in the step E2 as not belonging to the object and labelled in the step E3 as being located outside the contour passing through $V_j$, or $N_2$ pixels.

The new position of the control point $V_i$ is that of the pixel $V_j$ for which the sum $(N_1+N_2)$ is maximum, which is equivalent to minimizing the opposite of the sum $(N_1+N_2)$ in the energy term of the active contour.

The number of pixels $(N_1+N_2)$ obtained is standardized in the step E5 by the total number of pixels in the search window, and multiplied by a factor to supply the colour discrimination term of the energy of the active contour $E_{colour}(i, v_j)$. This multiplying factor must be negative and may, for example, be set at $-1$.

The duly obtained term $E_{colour}(i, v_j)$ is then added to the other known terms of the energy associated with an active contour, after multiplication by a weighting factor defined by the user, and the convergence of the contour is obtained iteratively by selecting, in the vicinity of each contour point, the candidate point which minimizes the total energy. Including the term $E_{colour}(i, v_j)$ makes it possible to incorporate in the contour estimation process a colour discrimination constraint, which tends to position the contour in such a way as to ensure a uniformity on the one hand, of all of the colours contained inside the contour, and, on the other hand, of all of the colours contained in a vicinity outside the contour.

Two possible methods of implementing the step E2 for classifying pixels located in the area between the inscribed and circumscribed contours are described below.

Figure 4:
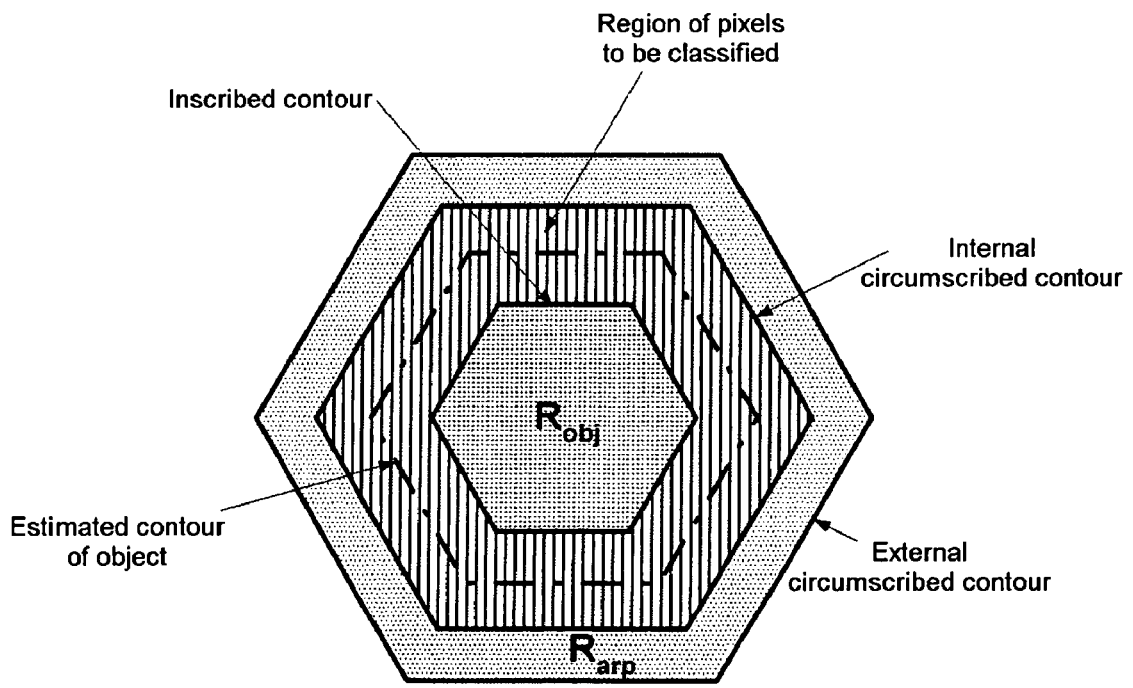
FIG. 4 shows the reference regions delimited by the different contours.

The first method used in the preferred embodiment is based on the construction of models of the distribution of colours of the object and its external vicinity. Constructing these models entails defining two reference regions in the image, represented in FIG. 4:
 a first reference region $R_{obj}$ is defined as the interior of the inscribed contour,
 a second region $R_{arp}$ is defined as the region between the contour circumscribed around the estimated contour, hereinafter called "internal circumscribed contour", and a new contour circumscribed around the internal contour, called "external circumscribed contour".

Because of the constraints imposed in the construction of the inscribed contour and of the internal circumscribed contour, $R_{obj}$ is necessarily internal to the object, whereas $R_{arp}$ is located in a vicinity external to the object.

With the reference regions $R_{obj}$ and $R_{arp}$, a model of the colour distribution of the object and a model of the colour distribution of the background in the vicinity of the object can be constructed. A first method of constructing these models is shown in FIG. 5, assuming the adoption of a statistical model of each of these colour distributions by a sum of Gaussian laws or "Gaussian mixing".

Figure 5:
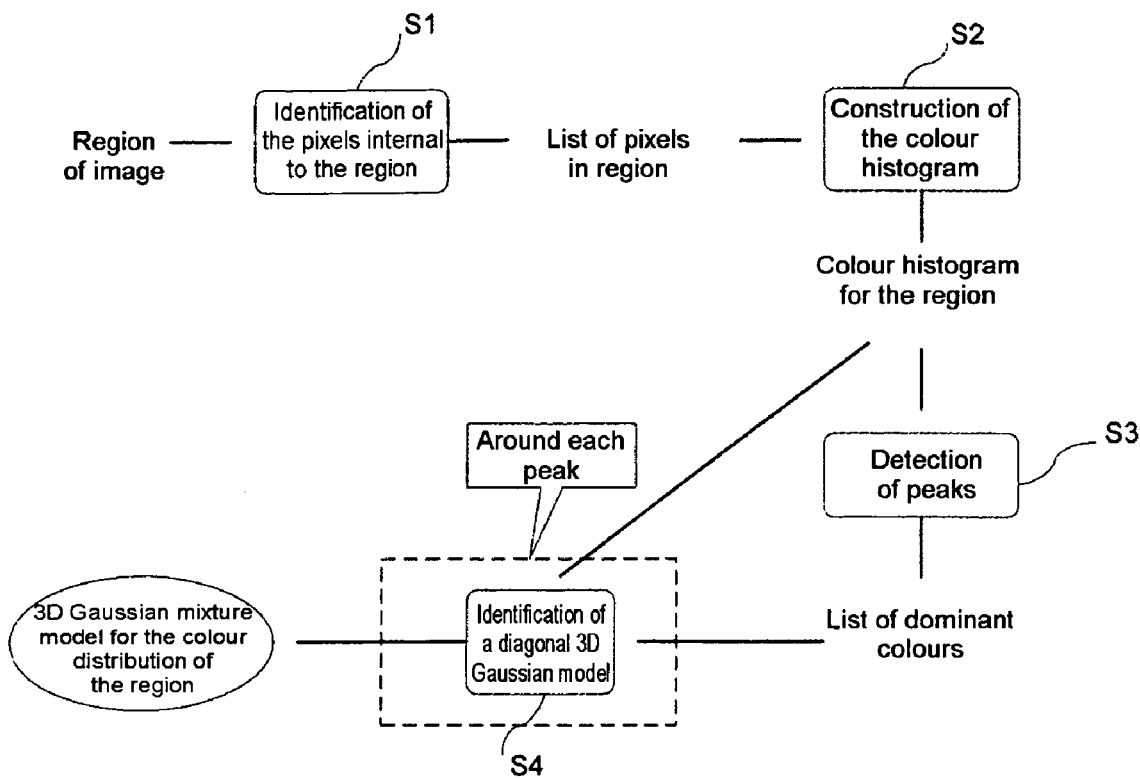
FIG. 5 shows a functional block diagram of calculating the colour model for the gutter and for the object to be segmented.

According to this method, with reference to FIG. 5, in a first step Si, the list of pixels inside the reference region concerned, in other words $R_{obj}$ for calculating the model of colour distribution of the object and $R_{arp}$ for calculating the model of the colour distribution for background, is constructed.

Then, in a step S2, the histogram of colours of the region is constructed. It will be recalled that this operation, conventional in image processing, uses a law for quantifying the representation space of the colour used that is allowed in principle. For example, it is possible to adopt a uniform N-level quantification according to each of the three colour axes, which is equivalent to quantifying each colour component in N possible values. The colour space is then divided into $N^3$ areas. The colour histogram of the region is defined as an array of $N^3$ cells or "bins", each bin being bijectively associated with an area. The value stored in a bin of the histogram represents the number of pixels of the region of the image processed with colour components that are located in the area of the colour space associated with the bin. The histogram is constructed by processing in turn all the pixels of the region concerned as follows: the colour components of each pixel are quantified, which determines the area of the colour space in which the pixel is located; the value of the bin associated with this area is then incremented by one unit.

The colour histogram provides a first model of the colour distribution of the region; efforts are then made to simplify the model to obtain a parametric model with a small number of parameters. To this end, in a step S3, regions of the histogram with high density are then detected. Peak detection algorithms, or "peak-picking" algorithms, widely known in computer graphics, can be used for this purpose. The output of the step S3 consists of a list of histogram peaks, corresponding to dominant colours strongly represented in the region concerned.

The object of the step S4 is to derive a parametric statistical model of the colour histogram, using the list of peaks detected in the step S3. The vicinity of each peak is likened to a three-dimensional Gaussian distribution in the colour space, which is equivalent to modelling the total distribution of the colours by a Gaussian mixture model (GMM). Each of the Gaussian distributions forming the GMM is entirely determined by its average and its covariance matrix; these parameters of the model are estimated from the values of the bins of the histogram in the vicinity of the peak concerned.

There is therefore, at the output of the step S4, a parametric model of the colour distribution of the region, in the form of a Gaussian mixture. It is then possible to construct, from the "object" and "background" regions $R_{obj}$ and $R_{arp}$, a model $M_{obj}$ of the colour distribution of the object and a model $M_{arp}$ of the colour distribution of the background. The binary classification of a pixel corresponding to the step E2 of the diagram in FIG. 2 can then be obtained by calculating the likelihoods $vr_{obj}$ and $vr_{arp}$ of the pixel for the models $M_{obj}$ and $M_{arp}$ respectively: if $vr_{obj}$ is greater than $vr_{arp}$, the pixel will be classified as "object", otherwise the pixel will be classified as "non-object".

A second method of implementing the step E2 for binary classification of the pixels as "object" or "non-object", with reference to FIG. 2, consists in using a "Seeded Region Growing" (SRG) algorithm, a detailed description of which can be found in the article by R. Adams and L. Bischof, entitled "Seeded region growing", published in the IEEE review, Transactions on Pattern Analysis and Machine Intelligence, volume 16 no 6, June 1994, pages 641 to 647.

Figure 6:
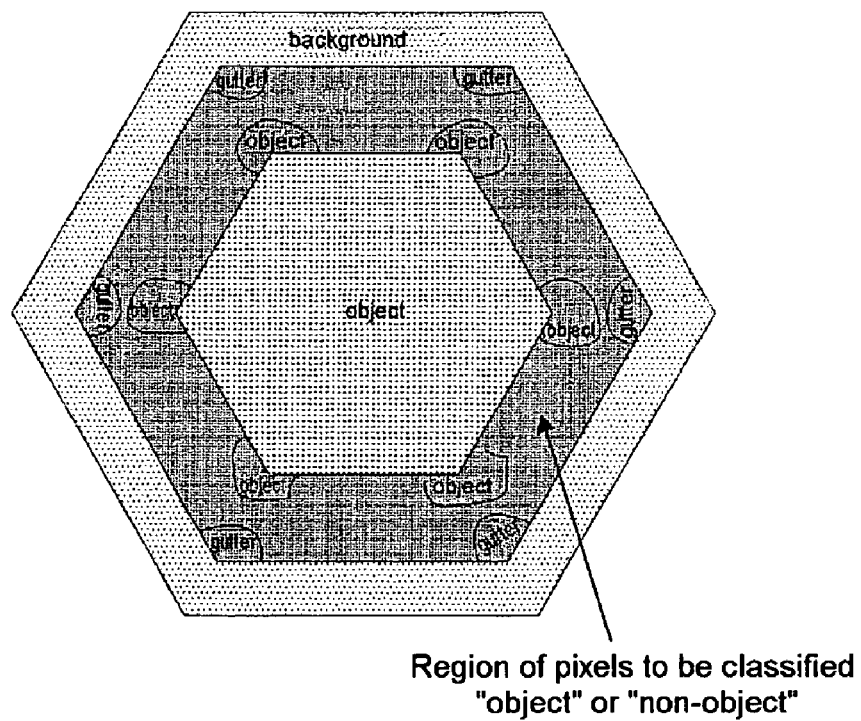
FIG. 6 illustrates an alternative method of binary classification between gutter and object, based on the "seeded region growing" algorithm.

The SRG algorithm classifies all the pixels of an area of an image by growing small regions defined at the origin and for which the classes are known. In the context of this invention, and in accordance with the diagram of FIG. 6, the initial regions are formed by small vicinities of points distributed evenly around the perimeters of the inscribed and circumscribed contours. The regions adjacent to the inscribed contour belong to the objects since the inscribed contour is internal to the object. Similarly, the regions adjacent to the circumscribed contour belong to the background.

The SRG algorithm maintains a list of the pixels not yet classified, inside the area to be processed, that are adjacent to an existing region. In this list, each pixel is associated with a distance to its adjacent region, and the pixels of the list are sorted in ascending order of their distance. The distance between a pixel and a region represents a criterion of uniformity between the colour of the pixel and the or each colour representative of the region. In a very simplified implementation, this distance can be defined as the Euclidean distance in the representation space of the colour, between the colour of the pixel and the average colour of the region.

An iteration of the algorithm consists in carrying out the following operations:
assigning the first pixel of the list (for which the distance attribute is the smallest) to the region to which it is adjacent,
updating the properties of the region (for example, its average colour) accordingly,
updating the vicinity of the region.

This process is applied iteratively until the list is empty, which means that all the pixels of the area to be classified have been assigned to an initial region. The classification of the pixels is then defined by the classification of the initial region to which it was assigned: "object" if this region was initially adjacent to the inscribed contour, "non-object" otherwise.

The invention is not limited to the exemplary embodiments given above.

What is claimed is:

1. Method of segmenting objects in an image for providing an estimated contour of said object to be segmented comprising steps for:
    approximating a definition of an external contour of the object to be segmented, said contour including a plurality of control points,
    determining a set of candidate points in the vicinity of each control point,
    determining an energy associated with each candidate point in the vicinity of each control point, the energy associated with each candidate point includes a colour discrimination term; and
    converging each of the control points towards the candidate point which minimizes said energy, so providing an estimated contour of the object to be segmented.

2. Method according to claim 1, including the step of automatically calculating a contour inscribed in the estimated contour, and a contour circumscribed around the estimated contour, such that the inscribed contour is internal to the object be segmented and the circumscribed contour is external to the object to be segmented.

3. Method according to claim 2, including the step of classifying in two regions pixels located in the space between the inscribed contour an the circumscribed contour, the pixels with a colour closer to the distribution of the colours of the object than the distribution of the gutter colours in the vicinity of the object being labelled object and the other pixels being labelled gutter.

4. Method according to claim 1, including the step of labelling the candidate points for each control point of the estimated contour, the label identifing whether each candidate point is internal to the estimated contour or external to the estimated contour.

5. Method according to claim 4, including the step of counting the pixels for each candidate point in the vicinity of each control point, from the number of points $N_1$ and $N_2$ defined as follows:
    $N_1$ is the number of points labelled as internal to the estimated contour and for which the colour is labelled object, $N_2$ is the number of points labelled as external to the estimated contour and for which the colour is labelled gutter.

6. Method according to claim 1, wherein the energy associated with each candidate point further includes a gradient term pulling the approximate contour drawn by the user towards the faces of the image, a tension term minimizing the length of the contour and a second-order regularization term minimizing the curves that are too pronounced.

7. Method according to claim 5, wherein the minimization of the energy term relative to the colour discrimination term occurs by selecting, for each control point, the candidate point in the vicinity of said control point for which the sum $N_1+N_2$ is minimal.

8. Device for segmenting objects in an image providing an estimated contour of said object to be segmented comprising:
    means for defining an approximation of a contour external to the object to be segmented, said contour including a plurality of control points, means for determining a vicinity of candidate points in the vicinity of each control point,
    means for determining an energy associated with each candidate point in the vicinity of each control point,
    means for determining the convergence of each of the control points towards the candidate point which minimizes said energy, so providing an estimated contour of the object to be segmented,
    wherein the energy associated with each candidate point includes a colour discrimination term.

* * * * *

UNITED STATES PATENT AND TRADEMARK OFFICE
CERTIFICATE OF CORRECTION

| | | |
|---|---|---|
| PATENT NO. | : 7,627,175 B2 | Page 1 of 1 |
| APPLICATION NO. | : 11/314380 | |
| DATED | : December 1, 2009 | |
| INVENTOR(S) | : Le Clerc et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Second Day of November, 2010

David J. Kappos
*Director of the United States Patent and Trademark Office*